US009295080B2

(12) United States Patent
Yang et al.

(10) Patent No.: US 9,295,080 B2
(45) Date of Patent: Mar. 22, 2016

(54) HIGH-SPEED TUNE-AWAY FOR MULTI-SIM DEVICES

(71) Applicant: QUALCOMM Incorporated, San Diego, CA (US)

(72) Inventors: Ming Yang, San Diego, CA (US); Tom Chin, San Diego, CA (US); Qingxin Chen, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 48 days.

(21) Appl. No.: 14/278,879

(22) Filed: May 15, 2014

(65) Prior Publication Data

US 2015/0334740 A1 Nov. 19, 2015

(51) Int. Cl.
*H04W 72/14* (2009.01)
*H04W 72/12* (2009.01)

(52) U.S. Cl.
CPC .......... *H04W 72/14* (2013.01); *H04W 72/1273* (2013.01)

(58) Field of Classification Search
None
See application file for complete search history.

(56) References Cited

U.S. PATENT DOCUMENTS

| 2010/0034158 A1 | 2/2010 | Meylan et al. | |
| 2012/0020310 A1* | 1/2012 | Ji | H04W 48/16 370/329 |
| 2013/0083737 A1 | 4/2013 | Earnshaw et al. | |
| 2013/0235843 A1* | 9/2013 | Gohari | H04W 80/06 370/331 |
| 2013/0244590 A1* | 9/2013 | Nukala | H04W 80/06 455/77 |
| 2015/0092708 A1* | 4/2015 | Su | H04W 76/026 370/329 |
| 2015/0237675 A1* | 8/2015 | Su | H04W 88/06 455/552.1 |

FOREIGN PATENT DOCUMENTS

| EP | 2117245 A1 | 11/2009 |
| WO | 2011088468 A1 | 7/2011 |
| WO | 2013176695 A1 | 11/2013 |

OTHER PUBLICATIONS

International Search Report and Written Opinion—PCT/US2015/027138—ISA/EPO—Oct. 2, 2015.

* cited by examiner

*Primary Examiner* — Hassan Kizou
*Assistant Examiner* — Hashim Bhatti
(74) *Attorney, Agent, or Firm* — Seyfarth Shaw LLP (57) ABSTRACT

A user equipment (UE) prevents re-transmissions of downlink high-speed data during a tune away procedure when an acknowledgment (ACK) to the high-speed data is not received at a network. In one instance, the UE decodes a first high-speed grant and corresponding downlink high-speed data before tuning away from a serving base station. The UE determines that a first timing for transmitting an acknowledgement of the decoded high-speed downlink data occurs during a tune away gap. The UE determines a second time for sending the acknowledgment based on a determination of a second high-speed grant missed during the tune away gap. The UE transmits an acknowledgement (ACK) for the decoded downlink high-speed data in accordance with a time line of the missed second high-speed grant.

20 Claims, 9 Drawing Sheets

HIGH-SPEED TUNE-AWAY FOR MULTI-SIM DEVICES

BACKGROUND

1. Field

Aspects of the present disclosure relate generally to wireless communication systems, and more particularly, to high-speed downlink packet access (HSDPA) tune away procedures for multi subscriber identity module (SIM) devices.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High-speed Packet Access (HSPA), which provides higher data transfer speeds and capacity to associated UMTS networks. HSPA is a collection of two mobile telephony protocols, High-speed Downlink Packet Access (HSDPA) and High-speed Uplink Packet Access (HSUPA) that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect of the present disclosure, a method for wireless communication is disclosed. The method includes decoding a first high-speed grant and corresponding downlink high-speed data before tuning away from a serving base station. The method also includes determining that a first time for transmitting an acknowledgement of the decoded downlink high-speed data occurs during a tune away gap. The method also includes determining a second time for sending the acknowledgment, based on a determination of a second high-speed grant missed during the tune away gap. The method further includes transmitting an acknowledgement (ACK) for the decoded downlink high-speed data in accordance with a time line of the missed second high-speed grant.

Another aspect discloses an apparatus for wireless communication and includes means for decoding a first high-speed grant and corresponding downlink high-speed data, before tuning away from a serving base station. The apparatus also includes means for determining that a first time for transmitting an acknowledgement of the decoded downlink high-speed data occurs during a tune away gap. The apparatus also includes means for determining a second time for sending the acknowledgment based on a determination of a second high-speed grant missed during the tune away gap. The apparatus further includes means for transmitting an acknowledgement (ACK) for the decoded downlink high-speed data in accordance with a time line of the missed second high-speed grant.

Another aspect discloses a computer program product for wireless communications in a wireless network having a non-transitory computer-readable medium. The computer readable medium has non-transitory program code recorded thereon which, when executed by the processor(s), causes the processor(s) to perform operations of decoding a first high-speed grant and corresponding downlink high-speed data, before tuning away from a serving base station. The program code also causes the processor(s) to determine that a first time for transmitting an acknowledgement of the decoded downlink high-speed data occurs during a tune away gap. The program code also causes the processor(s) to determine a second time for sending the acknowledgment, based on a determination of a second high-speed grant missed during the tune away gap. The program code further causes the processor(s) to transmit an acknowledgement (ACK) for the decoded downlink high-speed data in accordance with a time line of the missed second high-speed grant.

Another aspect discloses an apparatus for wireless communication and includes a memory and at least one processor coupled to the memory. The processor(s) is configured to decode a first high-speed grant and corresponding downlink high-speed data, before tuning away from a serving base station. The processor(s) is also configured to determine that a first time for transmitting an acknowledgement of the decoded downlink high-speed data occurs during a tune away gap. The processor(s) is also configured to determine a second time for sending the acknowledgment, based on a determination of a second high-speed grant missed during the tune away gap. The processor(s) is further configured to transmit an acknowledgement (ACK) for the decoded downlink high-speed data in accordance with a time line of the missed second high-speed grant.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
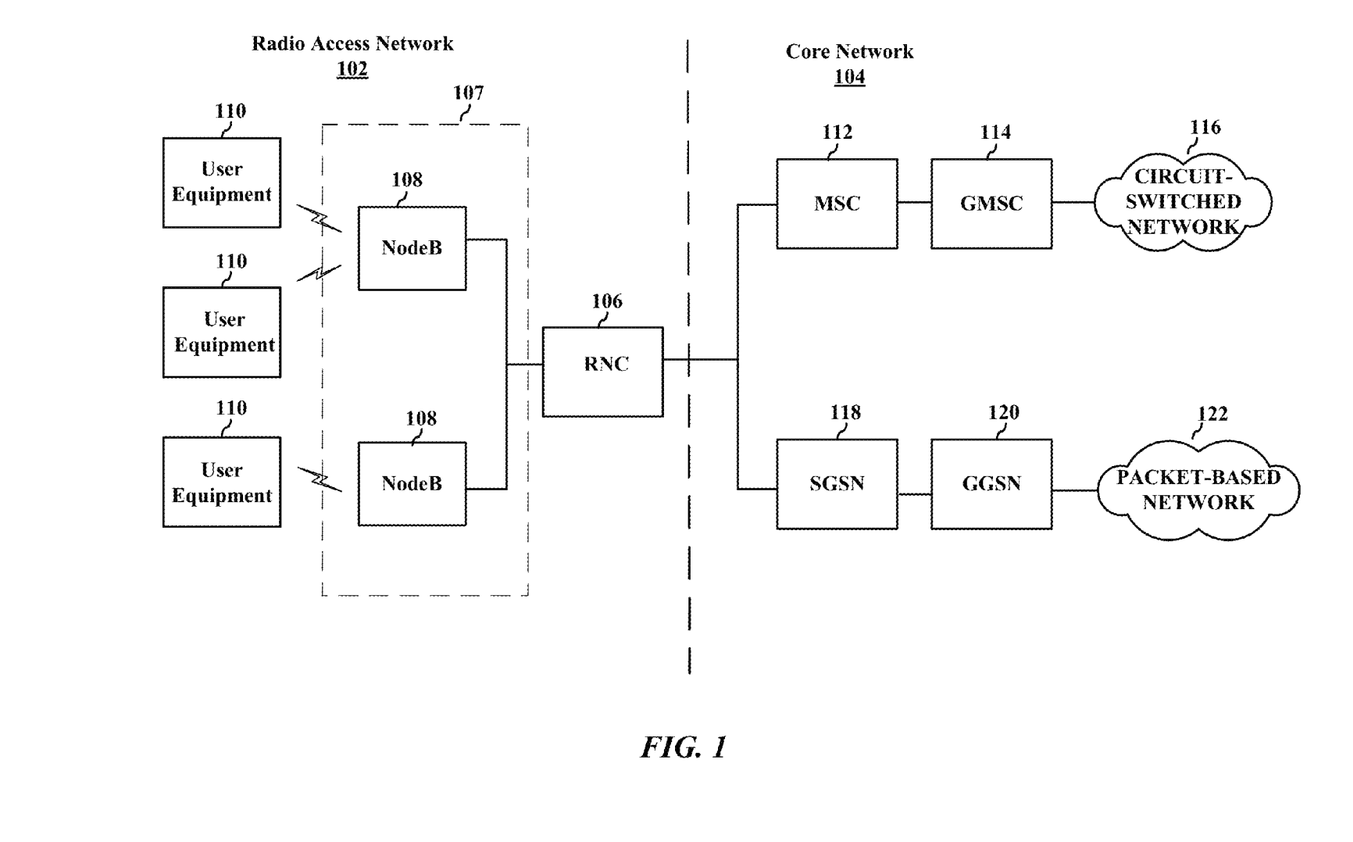
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
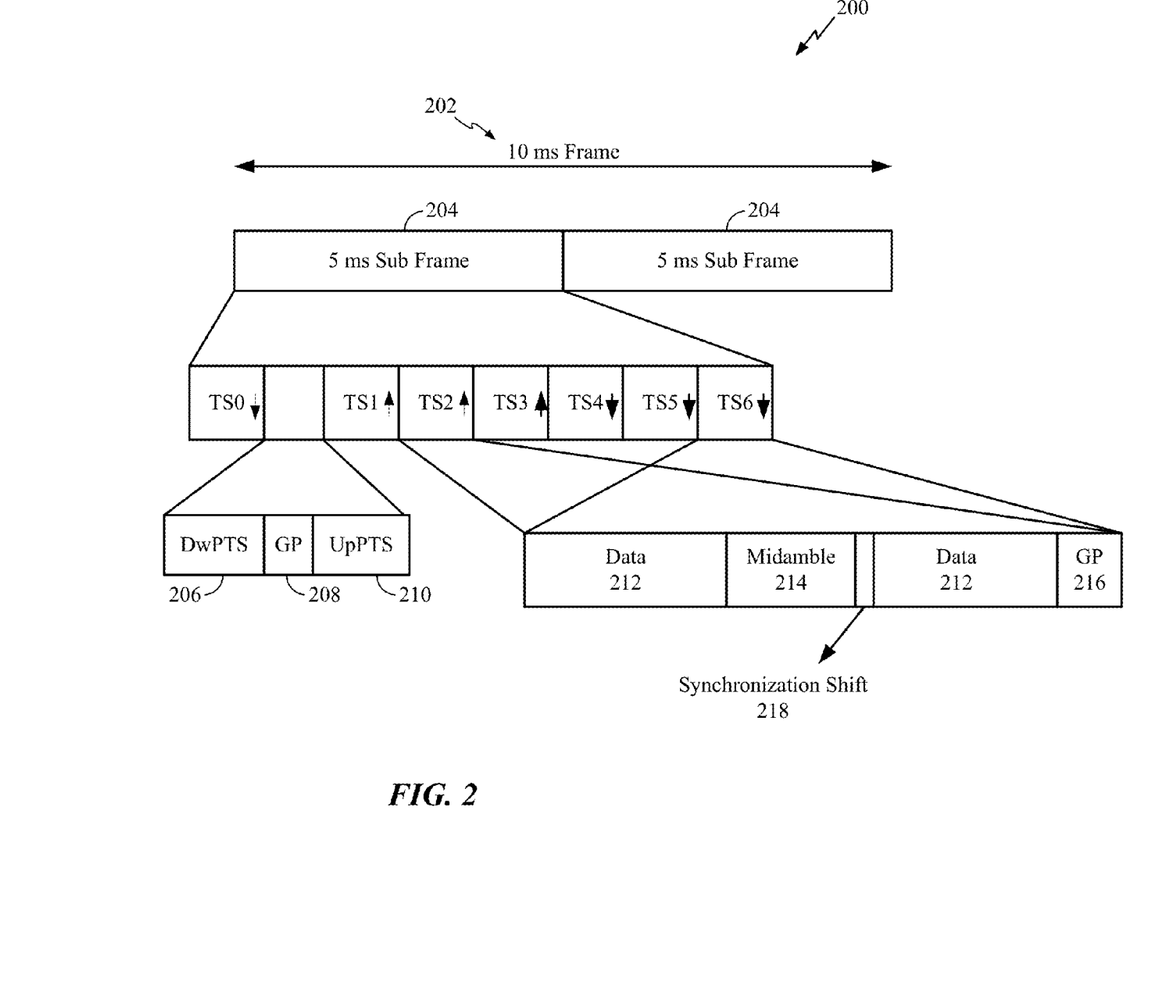
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
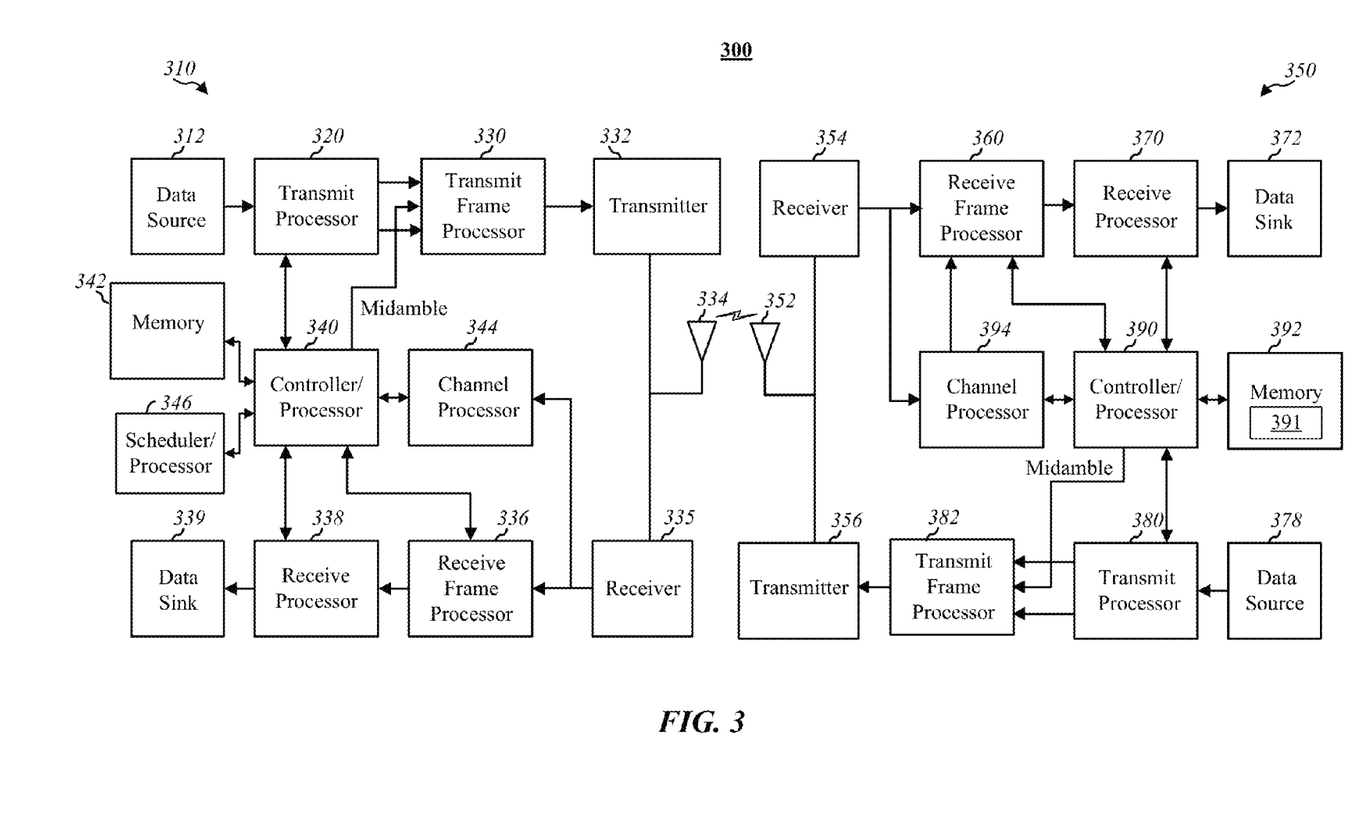
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the UE 350. For example, the memory 392 of the UE 350 may store a tune-away module 391 which, when executed by the controller/processor 390, configures the UE 350 to prevent re-transmissions of downlink high-speed data during a tune away procedure when an acknowledgment (ACK) to the high-speed data is not received.

High-speed networks are utilized to improve the uplink and downlink throughput. In particular, the high-speed downlink packet access (HSDPA) or time division high-speed downlink packet access (TD-HSUPA) is a set of enhancements to time division synchronous code division multiple access (TD-SCDMA) in order to improve downlink throughput. Additionally, the high-speed uplink packet access (HSUPA) or time division high-speed uplink packet access (TD-HSUPA) is a set of enhancements to time division synchronous code division multiple access (TD-SCDMA) in order to improve uplink throughput.

The following describes various TD-HSUPA physical channels. The enhanced uplink dedicated channel (E-DCH) is a dedicated transport channel that features enhancements to an existing dedicated transport channel carrying data traffic.

The enhanced data channel (E-DCH) or enhanced physical uplink channel (E-PUCH) carries E-DCH traffic and schedule information (SI). Information in this E-PUCH channel can be transmitted in a burst fashion.

The E-DCH uplink control channel (E-UCCH) carries layer 1 (or physical layer) information for E-DCH transmissions. The transport block size may be 6 bits and the retransmission sequence number (RSN) may be 2 bits. Also, the hybrid automatic repeat request (HARQ) process ID may be 2 bits.

The E-DCH random access uplink control channel (E-RUCCH) is an uplink physical control channel that carries SI and enhanced radio network temporary identities (E-RNTI) for identifying UEs.

The absolute grant channel for E-DCH (enhanced access grant channel (E-AGCH)) carries grants for E-PUCH transmission, such as the maximum allowable E-PUCH transmission power, time slots, and code channels. The hybrid automatic repeat request (hybrid ARQ or HARQ) indication channel for E-DCH (E-HICH) carries HARQ ACK/NAK signals.

The operation of TD-HSUPA may also have the following steps. First, in the resource request step, the UE sends requests (e.g., via scheduling information (SI)) via the E-PUCH or the E-RUCCH to a base station (e.g., NodeB). The requests are for permission to transmit on the uplink channels. Next, in a resource allocation step, the base station, which controls the uplink radio resources, allocates resources. Resources are allocated in terms of scheduling grants (SGs) to individual UEs based on their requests. In the third step (i.e., the UE Transmission step), the UE transmits on the uplink channels after receiving grants from the base station. The UE determines the transmission rate and the corresponding transport format combination (TFC) based on the received grants. The UE may also request additional grants if it has more data to transmit. Finally, in the fourth step (i.e., the base station reception step), a hybrid automatic repeat request (hybrid ARQ or HARQ) process is employed for the rapid retransmission of erroneously received data packets between the UE and the base station.

The following describes various TD-HSDPA physical channels. The high-speed physical downlink shared channel (HS-PDSCH) carries a user data burst(s). The high-speed shared control channel (HS-SCCH), also referred to as the grant channel, carries the modulation and coding scheme, channelization code, time slot and transport block size information for the data burst in HS-PDSCH. The HS-SCCH also carries the HARQ process, redundancy version, and new data indicator information for the data burst. Additionally, the HS-SCCH carries the HS-SCCH cyclic sequence number which increments a UE specific cyclic sequence number for each HS-SCCH transmission. Further, the HS-SCCH carries the UE identity to indicate which UE should receive the data burst allocation.

The high-speed shared information channel (HS-SICH) is also referred to as the feedback channel. The HS-SICH carries the channel quality index (CQI), the recommended transport block size (RTBS) and the recommended modulation format (RMF). Additionally, the HS-SICH also carries the HARQ ACK/NACK of the HS-PDSCH transmissions. The HS-SCCH contains the following information: the UE H-RNTI is masked on the CRC attachment; an 8-bit channelization code set that specifies which set of the 16 spreading factor 16 (SF16) codes is used; a 5-bit time slot information that specifies which time slot is scheduled; a 1-bit modulation scheme; a G-bit TB size index specifying 64 different block sizes; a 3-bit HARQ process ID; 3-bits for redundancy information; 1-bit for new data indication(s) and a 3-bit HS-SCCH cyclic sequence number (HCSN).

Additionally, each HS-SCCH specifies the HS-PDSCH allocation in the next subframe. The HS-PDSCH transmission follows in the next subframe (n+1). The HS-SICH transmission is in the next subframe (n+2). The association between the HS-SCCH in downlink (DL) and HS-SICH in uplink (UL) is pre-defined by higher layers.

A cyclic counter is incremented each time a HS-SCCH transmission is sent to a UE. The UE can determine whether it failed to detect and decode the previous HS-SCCH transmission by the cyclic counter (e.g., HCSN). For example, in a previous reception, the UE detects HS-SCCH with HCSN m (modulo 8). In the current reception, the UE detects HS-SCCH with HCSN m+2 (modulo 8). The UE then determines it missed detecting the HS-SCCH transmission with HCSN m+1.

In the typical network implementation, the retransmission takes higher priority than a new transmission. When the NodeB receives a NACK or DTX (discontinuous transmission) on the HS-SICH, the NodeB sends the HS-SCCH grant channel and schedule re-transmission in the next subframe. The UE can determine the network implementation based on past HARQ re-transmissions.

A user equipment (UE) may include more than one subscriber identity module (SIM) or universal subscriber identity module (USIM). A UE with more than one SIM may be referred to as a multi-SIM device. In the present disclosure, a SIM may refer to a SIM or a USIM. Each SIM may also include a unique International Mobile Subscriber Identity (IMSI) and service subscription information. Each SIM may be configured to operate in a particular radio access technology. Moreover, each SIM may have full phone features and be associated with a unique phone number. Therefore, the UE may use each SIM to send and receive phone calls. That is, the UE may simultaneously communicate via the phone numbers associated with each individual SIM. For example, a first SIM card can be associated for use in a City A and a second SIM card may be associated for use in a different City B to reduce roaming fees and long distance calling fees. Alternately, a first SIM card may be assigned for personal usage and a different SIM card may be assigned for work/business purposes. In another configuration, a first SIM card provides full phone features and a different SIM card is utilized mostly for data services.

Many multi-SIM devices support multi-SIM multi-standby operation using a single radio frequency (RF) chain to transmit and receive communications. In one example, a multi-SIM device includes a first SIM dedicated to operate in a first RAT and a second SIM dedicated to operate in a second RAT. In one illustrative example, the multi-SIM device includes a first SIM configured to operate in GSM (i.e., G subscription) and a second SIM configured to operate in TD-SCDMA (i.e., T subscription). When the T subscription is in the dedicated channel (DCH) state without voice traffic, the multi-SIM device supports the TD-SCDMA to GSM tune away with the least amount of interruption to the TD-SCDMA DCH operation. When the UE is in the TD-SCDMA dedicated channel, the UE periodically tunes away from TD-SCDMA, and tunes to GSM to monitor for pages. If the G subscription detects a page when the T to G tune away is active, the multi-SIM UE suspends all operations of the TD-SCDMA subscription and transitions to another RAT. If the other RAT subscription does not detect a page, the UE tunes back to TD-SCDMA and attempts to recover to the original operation of the TD-SCDMA subscription. The multi-SIM device may operate in other RATS known to those skilled in the art. for example LTE.

High-Speed Tune-Away for Multi-SIM Devices

Aspects of the present disclosure prevent re-transmissions of downlink high-speed data associated with a tune away procedure. In one instance, the UE transmits an acknowledgement (ACK) for successfully decoded high-speed data to the network based on a grant that was missed due to tune away. Transmitting the ACK for the high-speed data at this earlier opportunity avoids retransmission of the high-speed data after tuning back.

In one aspect, the user equipment (UE) may tune away from a first communication entity associated with the network to perform activities at a second communication entity. The activity performed when tuning away may include monitoring for paging information of a second RAT, collecting a system information block (SIB) of a second RAT/frequency, and/or performing cell reselection for a second RAT/frequency.

Before tuning away, the UE may receive a first high-speed grant from the network. The first high-speed grant corresponds to transmission of high-speed data to be received at the UE during a future time period indicated by the high-speed grant. Each high-speed grant transmitted by the network may include a grant sequence number (e.g., HCSN). For example, the first high-speed grant may have a grant sequence number of m+1.

In some aspects of the disclosure, the UE decodes the first high-speed grant and corresponding high-speed data before tuning away. For example, referring to FIG. 4B, the UE may receive the high-speed grant at subframe n-1 and the high-speed data may be scheduled for reception at subframe n. In response to successfully receiving and decoding the high-speed data, the UE should transmit an ACK to the network according to a HARQ time line.

Figure 4A:
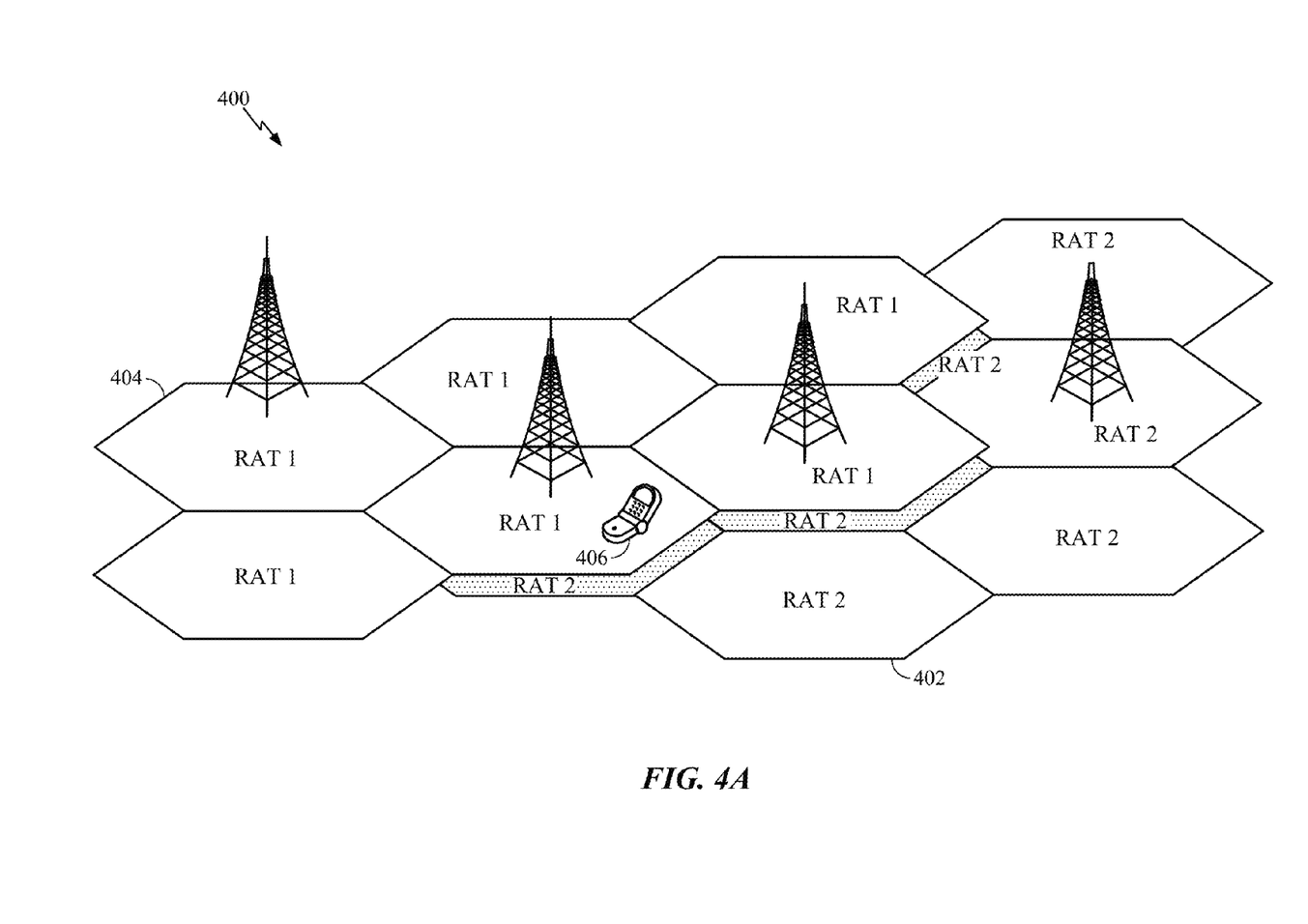
FIG. 4A illustrates network coverage areas according to aspects of the present disclosure.
Figure 4B:
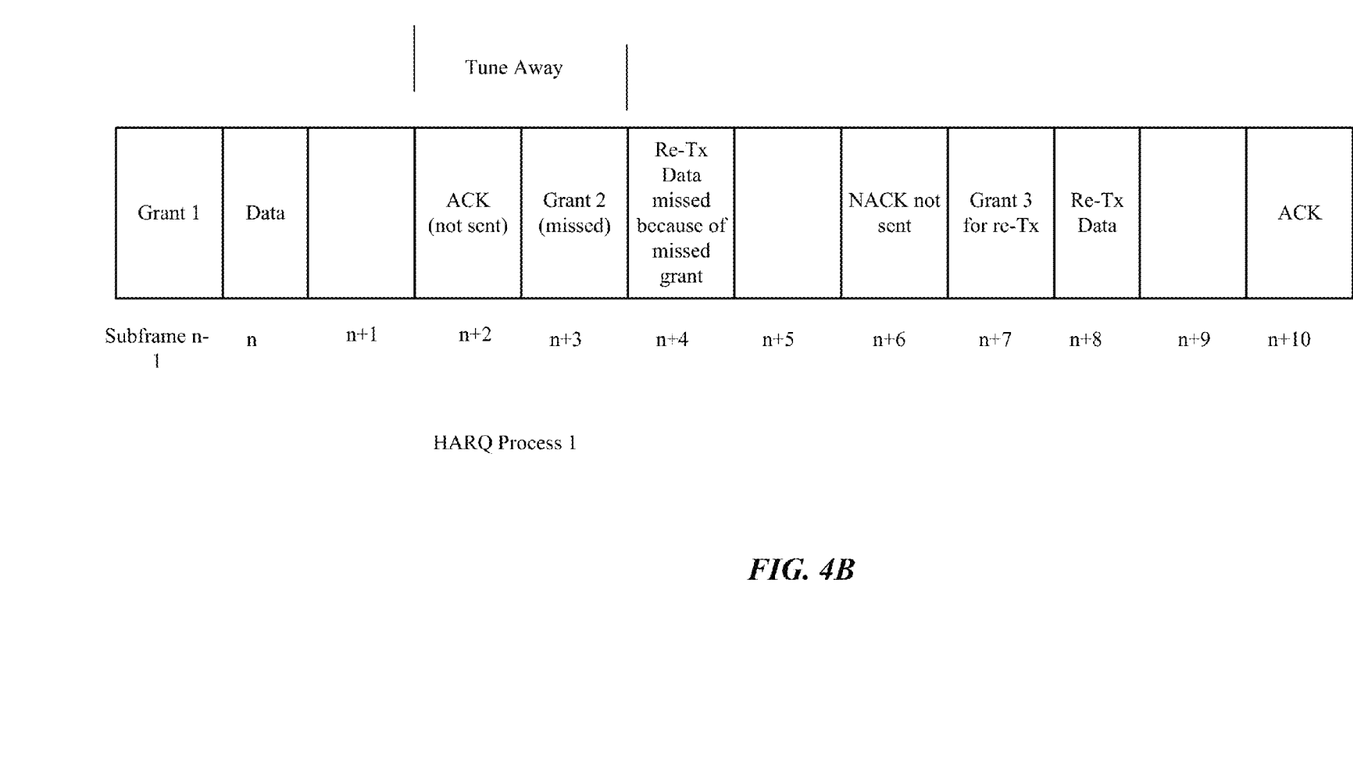
FIG. 4B illustrates a transmission timeline including a tune away gap.

In the present example, the ACK is scheduled for a time period (subframes n+2 and n+3) during which the UE is tuned away from the first communication entity. Thus, the network will not receive an ACK because the ACK is transmitted during a tune away gap. In other words, the UE is on another RAT so the UE does not transmit an ACK on the first communication entity.

Because the network did not receive an ACK, the network attempts to re-transmit the high-speed data to the UE. In some specifications, re-transmission of the high-speed data may be prioritized over transmission of new high-speed data. In this example, the transmission of a grant for the re-transmission falls in the tune away gap at subframe n+3. As a result, the UE does not receive the second high-speed grant (at subframe n+3) and the corresponding re-transmission of the high-speed data (at subframe n+4). The second high-speed grant may have a grant sequence number of m+2.

Because the second high-speed grant (m+2) and the corresponding high-speed data is not received, a NACK is not sent at subframe n+6 and thus the network again attempts to re-transmit the high-speed data. In this case, the network transmits a third high-speed grant at subframe n+7 after the UE tunes back to the first communication entity. The third high-speed grant may have a grant sequence number of m+3.

At subframe n+8 the retransmission is sent, and finally at subframe n+10 the ACK is sent. Thus, the ACK is sent ten subframes after the data was successfully received at subframe n. Moreover, the network retransmits twice (at subframes n+4 and n+8), unnecessarily using network resources because the data was actually received at subframe n.

Figure 5:
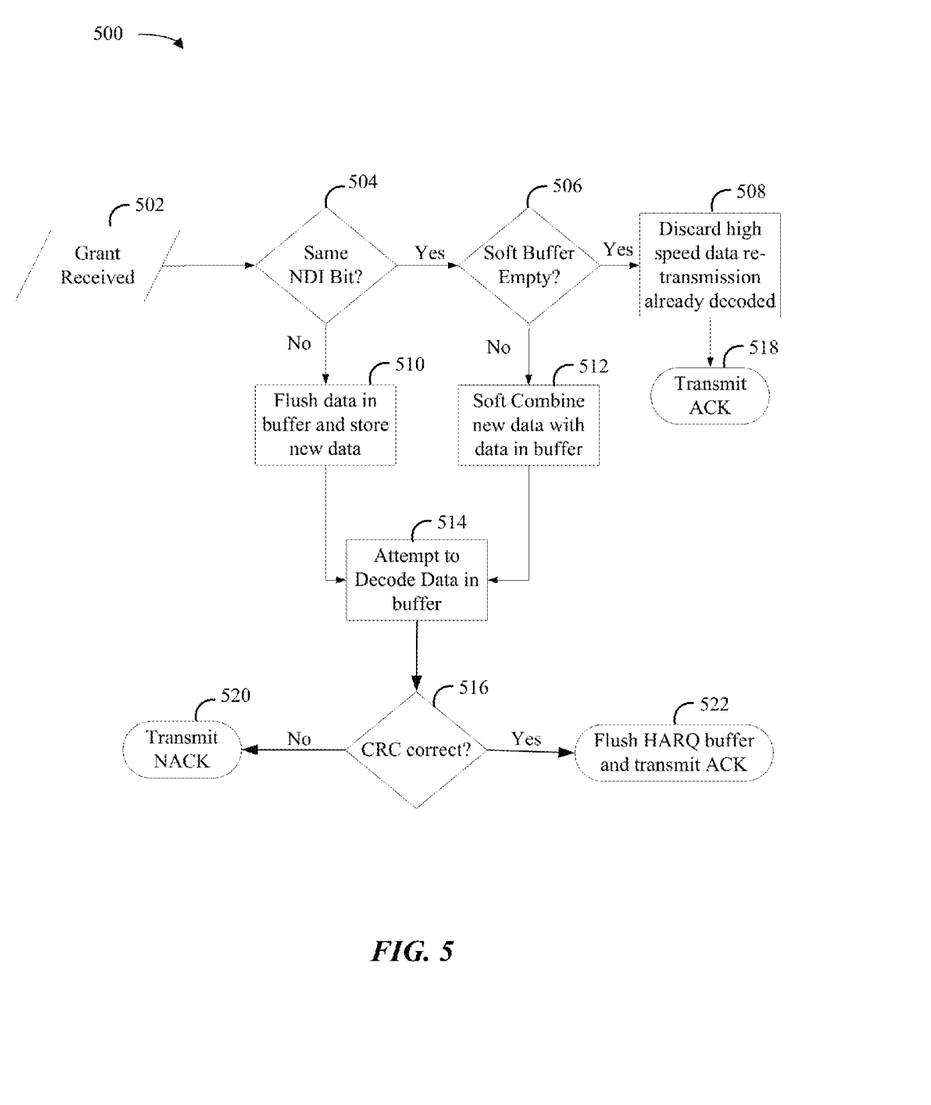
FIG. 5 is a flow diagram illustrating a wireless communication method for a hybrid automatic repeat request (HARQ) process during tune-away according to aspects of the present disclosure.

FIG. 5 is a flow diagram illustrating a wireless communication method 500 for a hybrid automatic repeat request (HARQ) process during tune-away according to aspects of the present disclosure. The HARQ process may be implemented at a lower layer (e.g., physical layer) and a higher layer (e.g., medium access control (MAC) layer).

At block 502, a UE receives a high-speed grant for a downlink high-speed data at the physical layer. The UE determines whether a new data indicator (NDI) bit for the high-speed grant is the same as a NDI bit for a previous high-speed grant, as shown in block 504. In some implementations, the NDI corresponds to the grant sequence number of the high-speed grant. When the NDI bit for the high-speed grant is the same as the NDI bit for a previous high-speed grant, the UE determines whether a soft buffer at the physical layer is empty, as shown in block 506. When the soft buffer is empty, the UE discards a re-transmission of the downlink high-speed data that is already decoded, as shown in block 508. The UE then transmits an ACK from the physical layer, as shown in block 518.

When the (NDI) bit for the high-speed grant is not the same as the NDI bit for the previous high-speed grant, the UE flushes data in the soft buffer and stores new downlink high-speed data, as shown in block 510. That is, new data, rather than a retransmission was sent. The UE then attempts to decode the new downlink high-speed data, as shown at block 514. When the UE determines the soft buffer is not empty, the UE attempts a soft combination of the new downlink high-speed data with data currently in the soft buffer, as shown in block 512. The UE then attempts to decode the data in the soft buffer, as shown at block 514. The process then continues to block 516.

At block 516, cyclic redundancy check (CRC) codes are checked to determine whether the downlink high-speed data were successfully decoded. If the CRC codes are correct (i.e., the downlink high-speed data was successfully decoded) a HARQ buffer at a higher layer (e.g., MAC layer) is flushed and an ACK of the downlink high-speed data is transmitted to the network, as shown in block 522. Otherwise, a negative acknowledgment (NAK) is transmitted at the higher layer, as shown in block 520.

Figure 6:
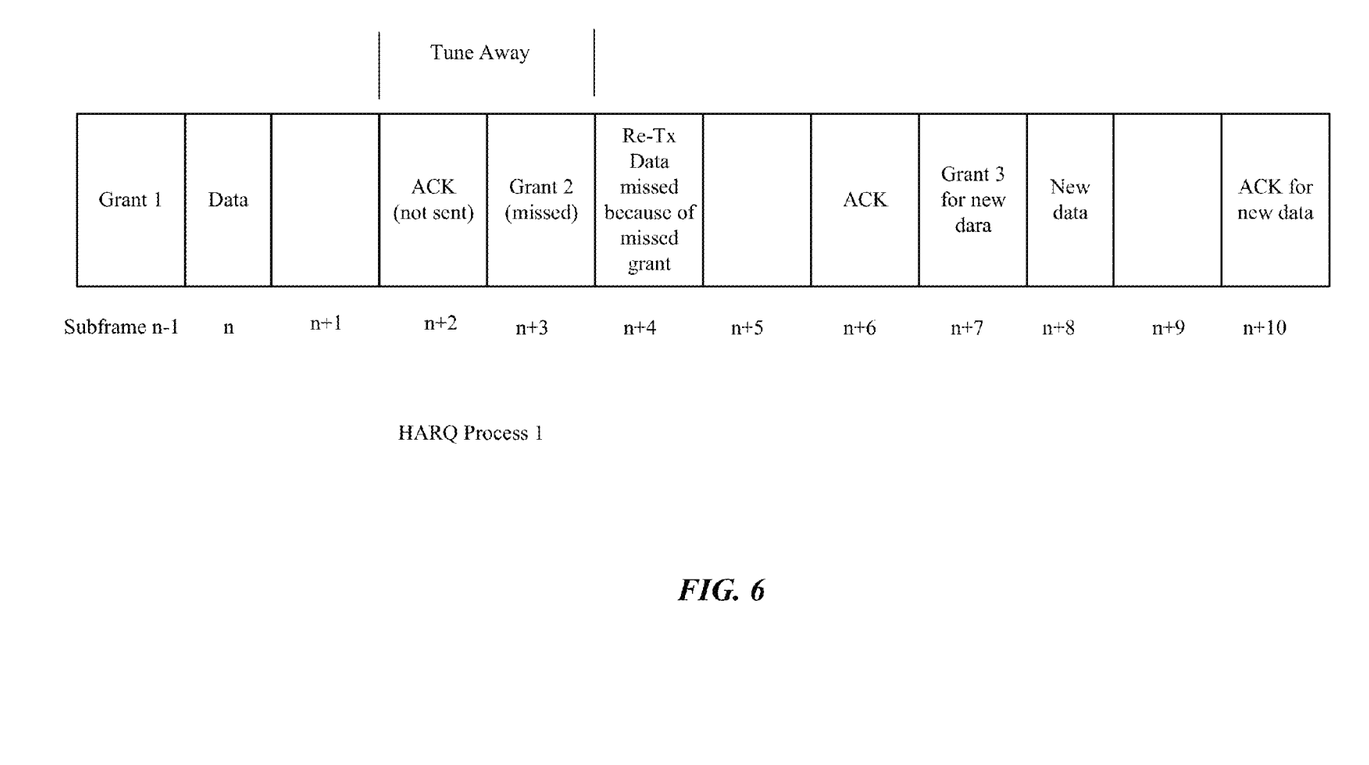
FIG. 6 illustrates a transmission timeline including a tune away gap according to aspects of the present disclosure.

FIG. 6 illustrates a transmission timeline including a tune away gap according to aspects of the present disclosure. Similar to the illustration of FIG. 4B, the UE receives the high-speed grant at subframe n−1 and the high-speed data is scheduled for reception at subframe n. The ACK for the decoded high-speed data is scheduled for a time period (subframes n+2 and n+3) during which the UE is tuned away from the first communication entity. Thus, the network will not receive an ACK because the ACK is scheduled during a tune away gap. The transmission of the grant for the re-transmission (re-Tx) falls in the tune away gap at subframe n+3. As a result, the UE does not receive the second high-speed grant (at subframe n+3) and does not receive the corresponding re-transmission of the high-speed data (at subframe n+4).

According to aspects of the present disclosure, when the UE tunes back, the UE determines whether a high-speed grant was missed during the tune-away gap. The determination is based on the predetermined HARQ timing association defined in a network specification. In response to the determination, the UE transmits an ACK for the decoded downlink high-speed data in accordance with a time line of the missed second high-speed grant, rather than waiting to receive a second re-transmission of the high-speed data (as in the illustration of FIG. 4B). That is, the UE sends an ACK at subframe n+6.

In this case, the network transmits a third high-speed grant at subframe n+7 for new data after the UE tunes back to the first communication entity. At subframe n+8 the new data is sent, and at subframe n+10 the ACK for the new data is sent.

In some aspects of the disclosure, the UE is a multi-subscriber identity module (SIM) UE. For example, the first communication entity may be associated with a first SIM, and the tuning away is in accordance with the second communication entity associated with a second SIM. In other aspects, the UE is a single-SIM UE. For example, the tuning away in accordance with the second communication entity may be for an IRAT or inter-frequency measurement of the single SIM UE.

In some aspects of the disclosure, different HARQ processes may be implemented at the UE. For example, a first HARQ process for decoding the downlink high-speed data prior to tuning away may be different and unrelated to a second HARQ process associated with the third high-speed grant. In other aspects, the third high-speed grant may be a new grant associated with the same HARQ process (e.g., HARQ process 1 illustrated in FIGS. 4B and 6) for decoding the downlink high-speed data prior to tuning away.

Figure 7:
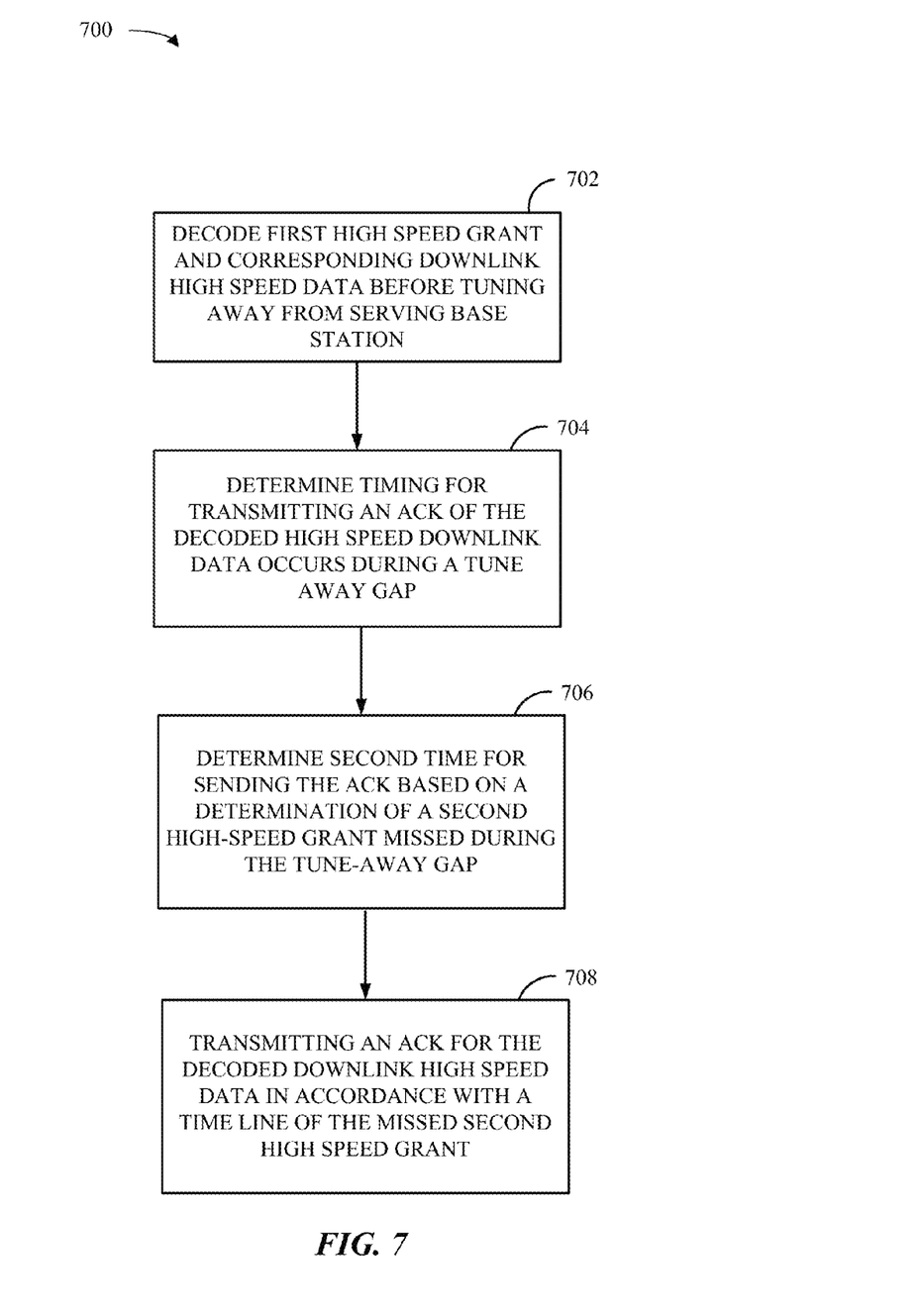
FIG. 7 is a flow diagram illustrating another wireless communication method for a hybrid automatic repeat request process during tune-away according to aspects of the present disclosure.

FIG. 7 is a flow diagram illustrating a wireless communication method 700 for a hybrid automatic repeat request process during tune-away according to aspects of the present disclosure. A UE decodes a first high-speed grant and corresponding downlink high-speed data before tuning away from a serving base station, as shown in block 702. The UE determines a first timing for transmitting an acknowledgement of the decoded high-speed downlink data occurs during a tune away gap, as shown in block 704. The UE determines a second time for sending the acknowledgment based at least in part on a determination of a second high-speed grant missed during the tune away gap, as shown in block 706. The UE transmits an acknowledgement (ACK) for the decoded downlink high-speed data in accordance with a time line of the missed second high-speed grant, as shown in block 708.

Figure 8:
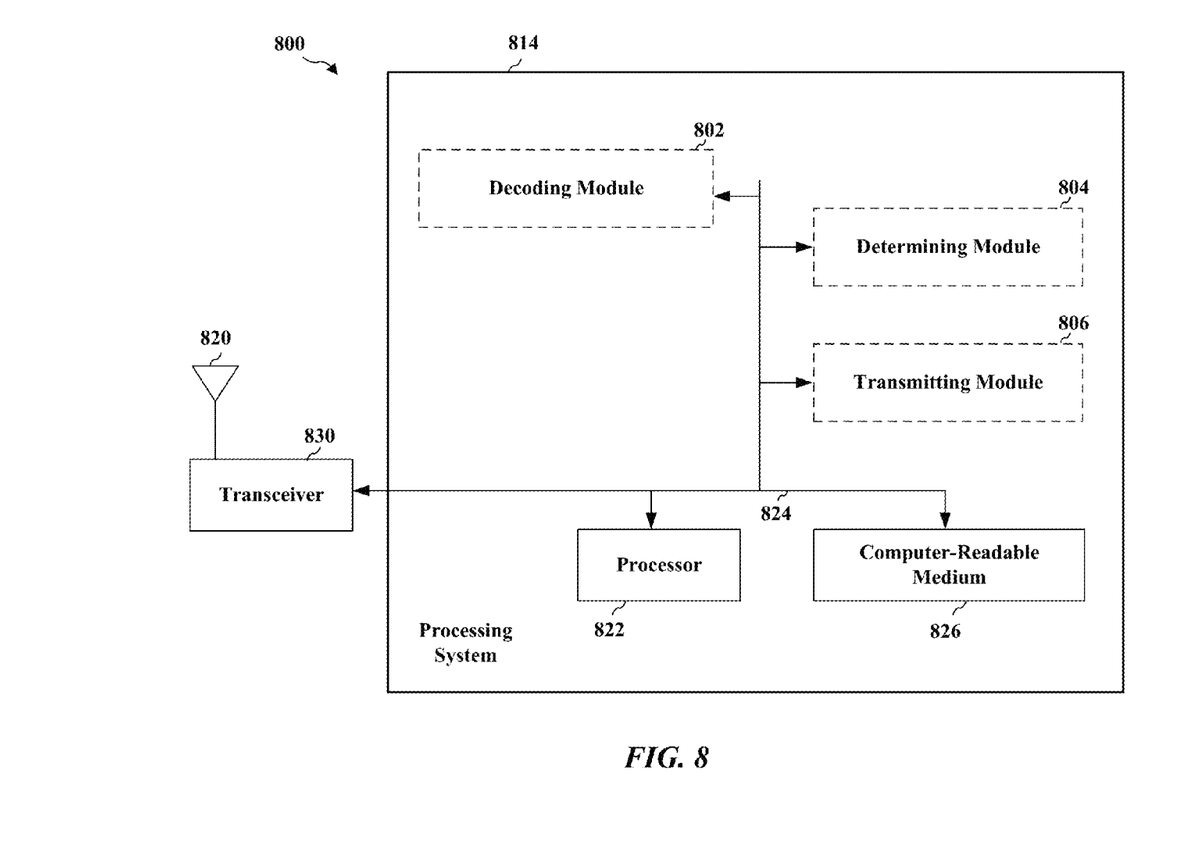
FIG. 8 is a diagram illustrating an example of a hardware implementation for an apparatus employing a processing system according to one aspect of the present disclosure.

FIG. 8 is a diagram illustrating an example of a hardware implementation for an apparatus 800 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 822 the modules 802, 804, 806 and the non-transitory computer-readable medium 826. The bus 824 may also link various other circuits such as timing sources, peripherals, voltage regulators, and power management circuits, which are well known in the art, and therefore, will not be described any further.

The apparatus includes a processing system 814 coupled to a transceiver 830. The transceiver 830 is coupled to one or more antennas 820. The transceiver 830 enables communicating with various other apparatus over a transmission medium. The processing system 814 includes a processor 822 coupled to a non-transitory computer-readable medium 826. The processor 822 is responsible for general processing, including the execution of software stored on the computer-readable medium 826. The software, when executed by the processor 822, causes the processing system 814 to perform the various functions described for any particular apparatus. The computer-readable medium 826 may also be used for storing data that is manipulated by the processor 822 when executing software.

The processing system 814 includes a decoding module 802 for decoding a first high-speed grant and corresponding downlink high-speed data before tuning away from a serving base station. The processing system 814 includes a determining module 804 for determining a first timing for transmitting an acknowledgement of the decoded high-speed downlink data occurs during a tune away gap. The determining module also determines a second time for sending the acknowledgment based at least in part on a determination of a second high-speed grant missed during the tune away gap. The processing system 814 includes a transmitting module 806 for transmitting an acknowledgement (ACK) for the decoded downlink high-speed data in accordance with a time line of the missed second high-speed grant. The modules may be software modules running in the processor 822, resident/stored in the computer readable medium 826, one or more hardware modules coupled to the processor 822, or some combination thereof. The processing system 814 may be a component of the UE 350 and may include the memory 392, and/or the controller/processor 390.

In one configuration, an apparatus such as a UE is configured for wireless communication including means for decoding. In one aspect, the decoding means may be the antennas 352/820, the transceiver 830, the receiver 354, the channel processor 394, the receive frame processor 360, the receive processor 370, the controller/processor 390, the memory 392, tune-away processing module 391, decoding module 802, and/or the processing system 814 configured to perform the decoding.

The UE is also configured to include means for determining. In one aspect, the determining means may be the controller/processor 390, the memory 392, tune-away processing module 391, the determining module 804, and/or the processing system 814 configured to perform the determining.

The UE is also configured to include means for transmitting. In one aspect, the transmitting means may be the antennas 352/820, the transceiver 830, the transmitter 356, the transmit frame processor 380, the transmit processor 380, the controller/processor 390, the memory 392, the tune-away processing module 391, the transmitting module 806, and/or the processing system 814 configured to perform the receiving. In one configuration, the means functions correspond to the aforementioned structures. In another aspect, the aforementioned means may be a module or any apparatus configured to perform the functions recited by the aforementioned means.

Several aspects of a telecommunications system has been presented with reference to TD-SCDMA and HSDPA systems. As those skilled in the art will readily appreciate, various aspects described throughout this disclosure may be extended to other telecommunication systems, network architectures and communication standards. By way of example, various aspects may be extended to other UMTS systems such as W-CDMA, High-speed Uplink Packet Access (HSUPA), High-speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
decoding a first high-speed grant and corresponding downlink high-speed data before tuning away from a serving base station;
determining that a first time for transmitting an acknowledgement of the decoded downlink high-speed data occurs during a tune away gap;
determining a second time for sending the acknowledgment based at least in part on a determination of a second high-speed grant missed during the tune away gap; and
transmitting an acknowledgement (ACK) for the decoded downlink high-speed data in accordance with a time line of the missed second high-speed grant.

2. The method of claim 1, in which a user equipment (UE) implements the decoding, determining, determining and transmitting, in which the UE comprises a multi subscriber identity module (SIM) UE, and in which the decoded downlink high-speed data is associated with a first SIM, and the tuning away is for communications associated with a second SIM.

3. The method of claim 1, in which the tuning away is for an inter radio access technology (IRAT) or inter-frequency activity of a single subscriber identity module (SIM) user equipment (UE).

4. The method of claim 1, in which a third high-speed grant for new data received after tuning back is associated with a same hybrid automatic repeat request (HARQ) process for the decoded downlink high-speed data before tuning away.

5. The method of claim 1, in which the determination of the second high-speed grant missed during the tune away gap is based at least in part on a predetermined HARQ timing association defined in a network specification.

6. An apparatus for wireless communication, comprising:
means for decoding a first high-speed grant and corresponding downlink high-speed data before tuning away from a serving base station;
means for determining that a first time for transmitting an acknowledgement of the decoded downlink high-speed data occurs during a tune away gap;
means for determining a second time for sending the acknowledgment based at least in part on a determination of a second high-speed grant missed during the tune away gap; and
means for transmitting an acknowledgement (ACK) for the decoded downlink high-speed data in accordance with a time line of the missed second high-speed grant.

7. The apparatus of claim 6, in which a user equipment (UE) implements the decoding, determining, determining and transmitting, in which the UE comprises a multi subscriber identity module (SIM) UE, and in which the decoded downlink high-speed data is associated with a first SIM, and the tuning away is for communications associated with a second SIM.

8. The apparatus of claim 6, in which the tuning away is for an inter radio access technology (IRAT) or inter-frequency activity of a single subscriber identity module (SIM) user equipment (UE).

9. The apparatus of claim 6, in which a third high-speed grant for new data received after tuning back is associated with a same hybrid automatic repeat request (HARQ) process for the decoded downlink high-speed data before tuning away.

10. The apparatus of claim 6, in which the determination of the second high-speed grant missed during the tune away gap is based at least in part on a predetermined HARQ timing association defined in a network specification.

11. An apparatus for wireless communication, comprising:
a memory; and
at least one processor coupled to the memory and configured:
to decode a first high-speed grant and corresponding downlink high-speed data before tuning away from a serving base station;
to determine that a first time for transmitting an acknowledgement of the decoded downlink high-speed data occurs during a tune away gap;
to determine a second time for sending the acknowledgment based at least in part on a determination of a second high-speed grant missed during the tune away gap; and
to transmit an acknowledgement (ACK) for the decoded downlink high-speed data in accordance with a time line of the missed second high-speed grant.

12. The apparatus of claim 11, in which a user equipment (UE) implements the decoding, determining, determining and transmitting, in which the UE comprises a multi subscriber identity module (SIM) UE, and in which the decoded downlink high-speed data is associated with a first SIM, and the tuning away is for communications associated with a second SIM.

13. The apparatus of claim 11, in which the tuning away is for an inter radio access technology (IRAT) or inter-frequency activity of a single subscriber identity module (SIM) user equipment (UE).

14. The apparatus of claim 11, in which a third high-speed grant for new data received after tuning back is associated with a same hybrid automatic repeat request (HARQ) process for the decoded downlink high-speed data before tuning away.

15. The apparatus of claim 11, in which the determination of the second high-speed grant missed during the tune away gap is based at least in part on a predetermined HARQ timing association defined in a network specification.

16. A computer program product for wireless communication, comprising:
a non-transitory computer-readable medium having program code recorded thereon, the program code comprising:
program code to decode a first high-speed grant and corresponding downlink high-speed data before tuning away from a serving base station;
program code to determine that a first time for transmitting an acknowledgement of the decoded downlink high-speed data occurs during a tune away gap;
program code to determine a second time for sending the acknowledgment based at least in part on a determination of a second high-speed grant missed during the tune away gap; and
program code to transmit an acknowledgement (ACK) for the decoded downlink high-speed data in accordance with a time line of the missed second high-speed grant.

17. The computer program product of claim 16, in which a user equipment (UE) implements the decoding, determining, determining and transmitting, in which the UE comprises a multi subscriber identity module (SIM) UE, and in which the decoded downlink high-speed data is associated with a first SIM, and the tuning away is for communications associated with a second SIM.

18. The computer program product of claim 16, in which the tuning away is for an inter radio access technology (IRAT) or inter-frequency activity of a single subscriber identity module (SIM) user equipment (UE).

19. The computer program product of claim 16, in which a third high-speed grant for new data received after tuning back is associated with a same hybrid automatic repeat request (HARQ) process for the decoded downlink high-speed data before tuning away.

20. The computer program product of claim 16, in which the determination of the second high-speed grant missed during the tune away gap is based at least in part on a predetermined HARQ timing association defined in a network specification.

\* \* \* \* \*